United States Patent [19]
Delahoussaye et al.

[11] Patent Number: 4,538,825
[45] Date of Patent: Sep. 3, 1985

[54] WHEELCHAIR ANTI-ROLLBACK MECHANISM

[75] Inventors: Ronald D. Delahoussaye, Ruston, La.; James W. Brazell, II, Atlanta, Ga.

[73] Assignee: Georgia Tech Research Institute, Atlanta, Ga.

[21] Appl. No.: 590,429

[22] Filed: Mar. 15, 1984

[51] Int. Cl.³ ............................................. B62M 1/14
[52] U.S. Cl. ......................... 280/242 WC; 188/82.3; 188/82.84; 297/DIG. 4
[58] Field of Search .................. 280/242 R, 242 WC; 180/10; 297/DIG. 4; 188/2 F, 30, 82.1, 82.3, 82.84; 192/41 R, 41 A, 45; 74/144

[56] References Cited
U.S. PATENT DOCUMENTS

| | | | |
|---|---|---|---|
| 3,869,146 | 3/1975 | Bulmer | 280/242 WC |
| 3,897,857 | 8/1975 | Rodaway | 188/2 F |
| 4,320,818 | 3/1982 | Knoche | 280/242 WC |
| 4,462,605 | 7/1984 | Morgan et al. | 280/242 WC |

FOREIGN PATENT DOCUMENTS 2034427  6/1980  United Kingdom .............. 188/2 F

*Primary Examiner*—Joseph F. Peters, Jr.
*Assistant Examiner*—Kenneth R. Rice
*Attorney, Agent, or Firm*—Newton, Hopkins & Ormsby

[57] ABSTRACT

The customary side hand propulsion ring adjacent to each main wheel of a manual wheelchair is mounted through a lost motion connection between the propulsion ring and main wheel so that the propulsion ring can have limited rotational movement relative to the main wheel. A friction brake drum or partial drum fixed to the wheelchair frame inside of the main wheel is engaged by at least one of a plurality of circumferentially spaced over center friction locking devices pivotally held on the main wheel. Each over center friction locking device is moved by a release element to a non-locking position relative to the drum or partial drum in response to reverse movement of the propulsion ring by a chair occupant. Economy and ease of operation are provided for. The wheelchair occupant need not remove his or her hand from the propulsion ring when operating the anti-rollback mechanism.

14 Claims, 8 Drawing Figures

WHEELCHAIR ANTI-ROLLBACK MECHANISM

CROSS-REFERENCE TO RELATED APPLICATION

This application contains subject matter in common with prior application Ser. No. 06/508,603, filed June 28, 1983, for WHEELCHAIR HAVING ANTI-ROLLBACK MECHANISM, now U.S. Pat. No. 4,462,605.

BACKGROUND OF THE INVENTION

The anti-rollback mechanism for manual wheelchairs disclosed in the prior patent application, while completely effective in its operation, is constructed with relatively expensive precision machine parts including sprag clutches and stainless steel races. This tends to reduce the overall practicality of the mechanism from a commercial standpoint.

Accordingly, it is the object of the present invention to provide a wheelchair anti-rollback mechanism of considerably greater simplicity, constructed from comparatively inexpensive components, such as bicycle brake pads and simple springs, all without loss of the full operational capability of the mechanism in the prior application. In fact, both mechanisms are operated in exactly the same manner by the occupant of a manual wheelchair. The less expensive mechanism embodied in this invention utilizes a simple over center linkage including component parts which can be stamped from sheet metal or molded from plastics.

An object of the present invention is to provide a wheel-chair anti-rollback mechanism which utilizes instead of an expensive one-way clutch a simple over center friction lock mechanism including a partial or complete brake drum fixed to the frame of the chair and cooperative pivoted over center brake shoes carried by the main wheel of the chair, together with simplified means to release the shoes when backward propulsion of the wheelchair is desired. As in the prior application, the mechanism normally allows only forward motion of the manual wheelchair as when traveling up an incline, thereby greatly reducing the effort expended by the user in powering the chair at this time. Without any anti-rollback mechanism on the chair, the user must exert a force on the propulsion ring with the hands and arms to counter the tendency for the chair to roll backwards on an incline. The extra energy required to prevent backward movement of the chair greatly increases the fatigue factor, especially when traveling up long inclines. The energy required is expended much more beneficially for producing forward motion only according to the invention.

Further objects of the invention are to provide an anti-rollback mechanism of decreased weight compared to previous designs, wherein the mechanism does not contribute to tire wear, and to utilize a self-locking friction mechanism as the heart of the anti-rollback system.

Other features and advantages of the invention will become apparent during the course of the following description.

DETAILED DESCRIPTION

Figure 1:
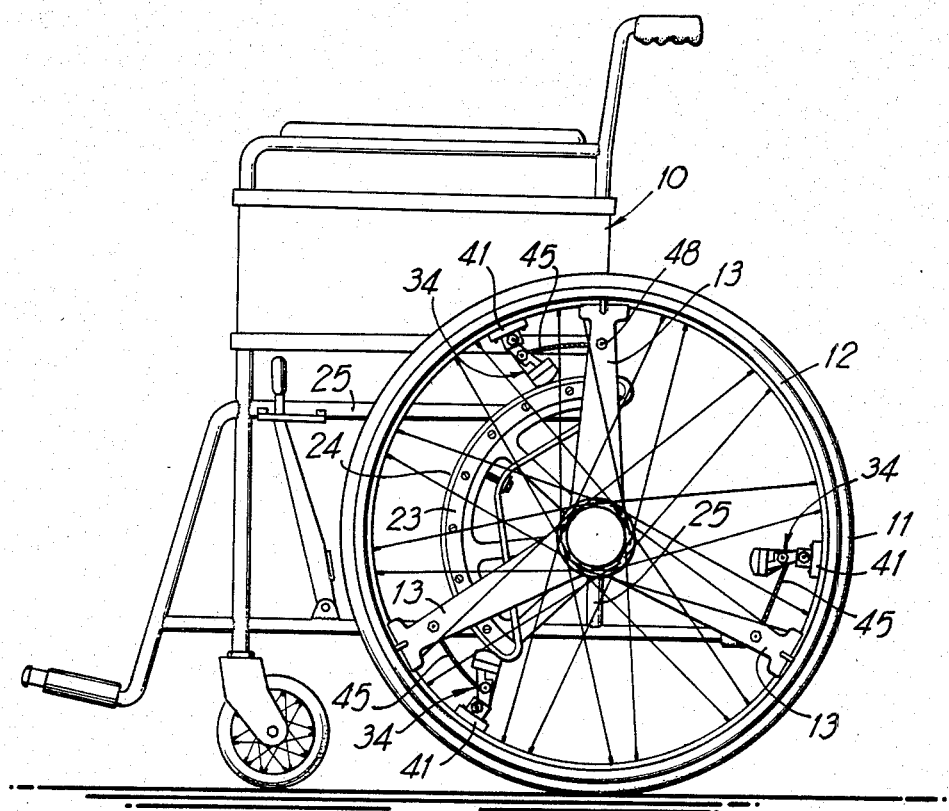
FIG. 1 is a side elevation of a manual wheelchair equipped with the anti-rollback mechanism according to one preferred embodiment of the invention.

Referring to the drawings in detail wherein like numerals designate like parts, a conventional manually powered wheelchair 10 includes main wheels 11, each having a manual propulsion ring 12 disposed near the outer side thereof in ready reach of the hands of a chair occupant.

In the present invention, as in the prior referenced patent application, the propulsion ring 12 is not directly and rigidly anchored to the main wheel 11 but instead is connected therewith through a lost motion mechanism, whereby the ring 12 can be rotated in either direction relative to the wheel 11 through short distances only.

The lost motion mechanism comprises preferably three circumferentially spaced spokes 13, adapted to be formed of sheet metal and being connected to form a unitized hub at their inner ends by yoke extensions 14 having fastener-receiving apertures 15. The hub structure of the spokes 13 thus formed can be supported on a suitable low friction bearing carried by the axle of the main wheel 11, substantially in the manner disclosed in the prior referenced application. The arrangement forms a three spoke spider structure which can have limited rotation about the axle of the main wheel 11.

Each spoke 13 carries an outer end crosshead 16 having a slot 17 receiving a radial drive pin 18 fixed to and projecting inwardly from the rim 19 of main wheel 11. It can be seen that a rotational lost motion connection between the wheel 11 and the spider consisting of the spokes 13 is provided.

The manual propulsion ring 12 is equipped on its inner side at circumferentially spaced points with threaded studs 20 engaging through openings 21 of the spokes 13 near their outer ends, the studs receiving nuts 22 thereon to complete the rigid connections between propulsion ring 12 and the spokes 13.

The anti-rollback mechanism proper comprises a circular brake drum sector 23 having a friction facing 24, and being disposed interiorly of the wheel 11 and between such wheel and the adjacent side frame structure 25 of the wheelchair. The drum sector 23 is secured by screws 26 to a sector mounting plate 27 having a center opening 28 receiving a projecting horizontal support pin 29 carried by the frame structure 25 and being coaxial with the axis of rotation of the wheel 11. The arcuate surface of friction facing 24 is concentric with the wheel 11 and propulsion ring 12, as shown.

The attaching screws 26 for brake drum sector 23 after passing through apertures 30 of sector mounting plate 27 are received in threaded openings 31 of clips 32 and 33 which embrace vertical and horizontal components of the chair frame 25 to secure the drum sector to such frame rigidly. In some cases, a complete circular friction brake drum can be utilized in lieu of the drum sector 23, the latter being preferred in the interest of saving weight.

The anti-rollback mechanism further includes preferably three over center friction brake shoe devices spaced equidistantly circumferentially of the wheel 11 and spaced somewhat from corresponding sides of the spokes 13. Each device 34 comprises a shoe element 35 having a friction lining 36 of rubber or the like secured thereto, the lining preferably having an arcuate face 37 for contact with the drum facing 24. Each shoe element 35 is pivoted by a bolt 38 or the like to an arm 39, which in turn is pivoted through another bolt 40 to an anchor plate 41 fixed to the inner face of the main wheel rim 19.

Bifurcated extensions 42 of each arm 39 straddle a web 43 of the shoe element 35 and engage ledge surfaces 44 of the shoe element to restrict pivoting of the shoe element 35 on the arm 39 carrying it.

Basically, the three brake shoe devices 34 are free-swinging on their pivots 40 with the anchor plates 41. The spacing of the devices 34 on the wheel 11 is such that there will always be contact between one of the devices 34 and the drum sector 23.

Figure 5:
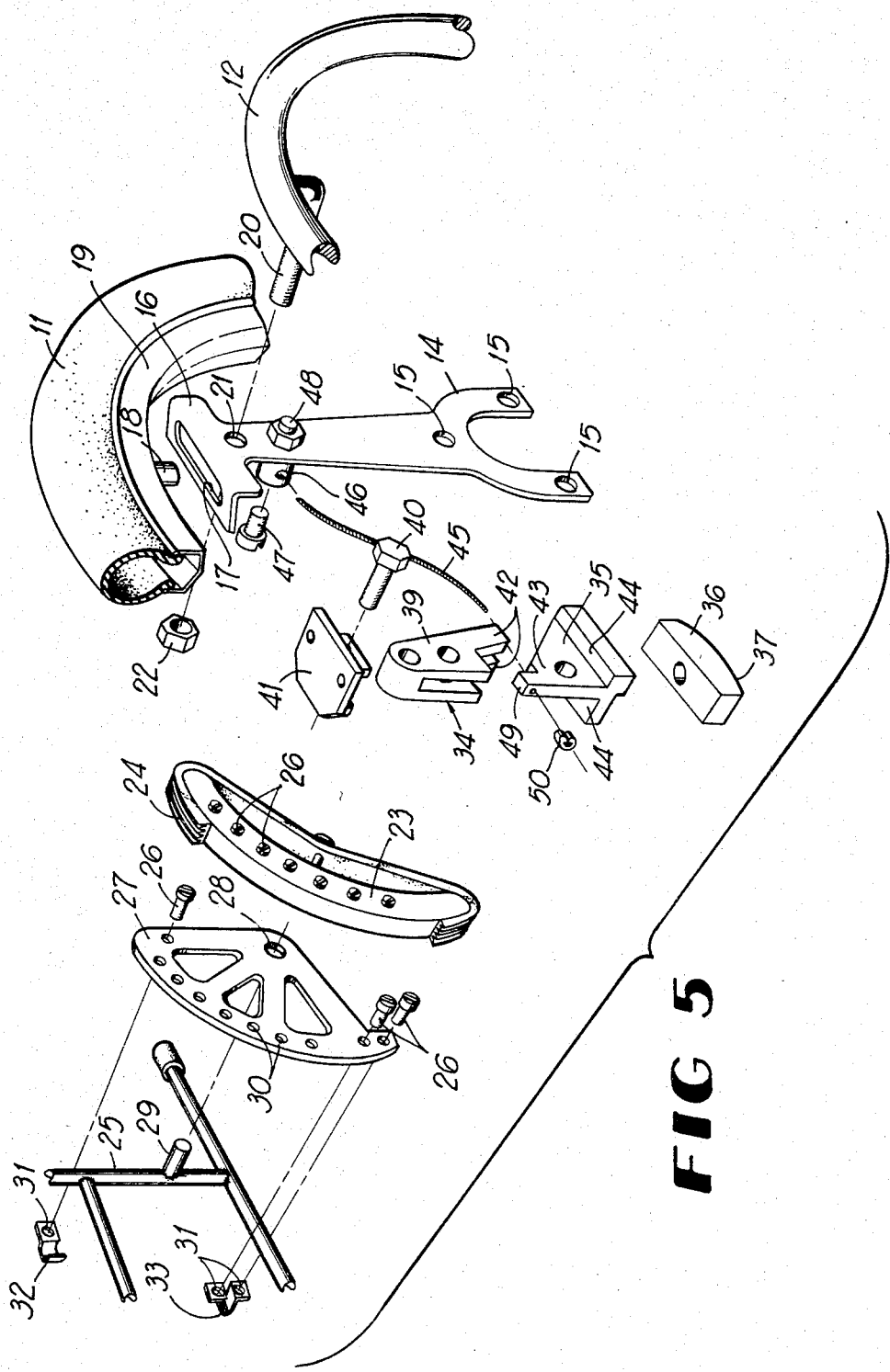
FIG. 5 is a fragmentary exploded perpsective view of components of the anti-rollback mechanism.

For releasing the anti-rollback brake shoe devices 34 at proper times so that a chair occupant can propel the chair rearwardly, cables 45 are connected between the spokes 13 of the lost motion mechanism and the devices 34. More particularly, corresponding ends of the cables 45 are secured within cable connectors 46 on the spokes 13 by clamping set screws 47. The connectors 46 are secured to the spokes 13 at 48, somewhat inwardly of the spoke crossheads 16, FIG. 5. The other ends of cables 45 are connected to top extensions 49 of shoe elements 35 by connector elements 50. The cables are thus attached to the elements 35 above their articulation axes 38 with the arms 39.

Figure 2:
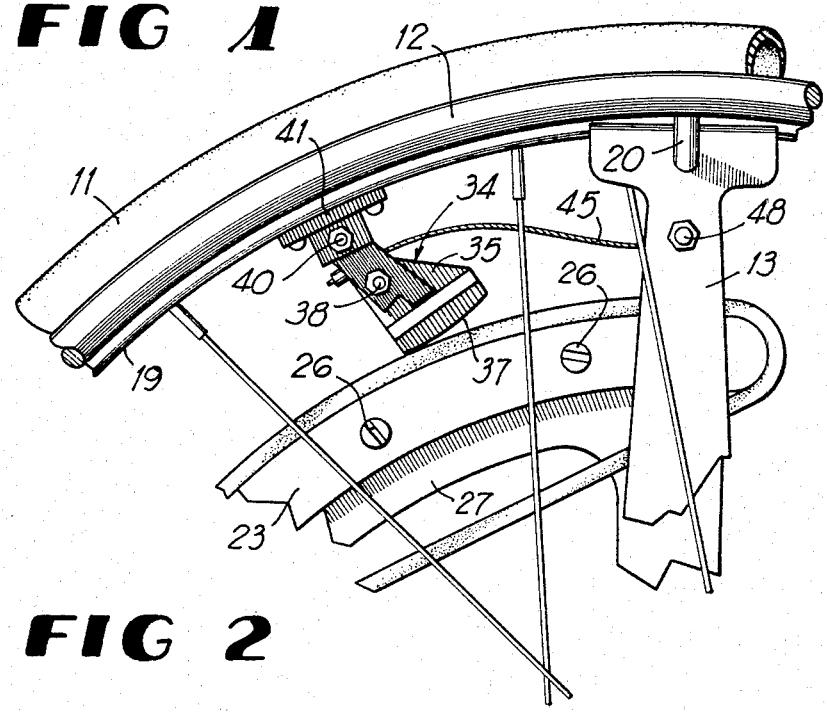
FIG. 2 is an enlarged fragmentary side elevation showing the mechanism where the chair is in the normal forward movement mode.

In the operation of the wheelchair in a forward mode, FIG. 2, the shoe elements 35 merely drag lightly over the friction facing 24 of drum sector 23. In this mode, the brake shoe devices 34 assume angled relationships to the drum sector, FIG. 2, and the two pivot elements 38 and 40 are out of alignment radially of the wheel 11. The devices 34 do not impede normal forward propulsion of the wheelchair by use of the propulsion ring 12 by its occupant.

Figure 3:
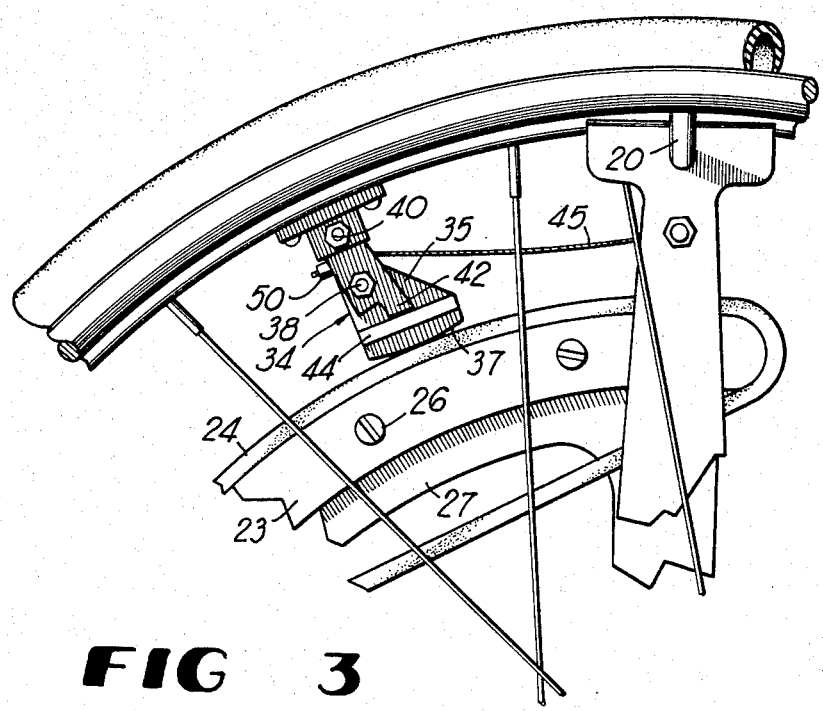
FIG. 3 is a similar view of the mechanism in the locked mode to prevent backward rolling of the chair.

If the chair is being propelled forwardly up an incline, each time manual pressure on the rings 12 is released, the anti-rollback devices 34, one of which is always passing over the drum sector 23, become activated automatically and assume the positive locking positions relative to the drum sector 23 as shown in FIG. 3, without the requirement for any activity by the chair occupant. The tendency for reverse movement of the chair on the incline forces the friction lining 36 into tight locking engagement with facing 24, FIG. 3, and the two pivot elements 38 and 40 move closer to a radial dead center relationship. The extensions 42 of pivoted arms 39 now bear solidly on the ledges 44 of shoe elements 35. The devices 34 now securely lock the chair wheel 11 against backward rotation on the incline. The slight angularity of the devices 34 from the true radial and the action of the extensions 42 on the pivoted shoe elements 35 prevent the devices 34 from swinging beyond or through their locking positions shown in FIG. 3 under the tendency of the chair to roll rearwardly.

Figure 4:
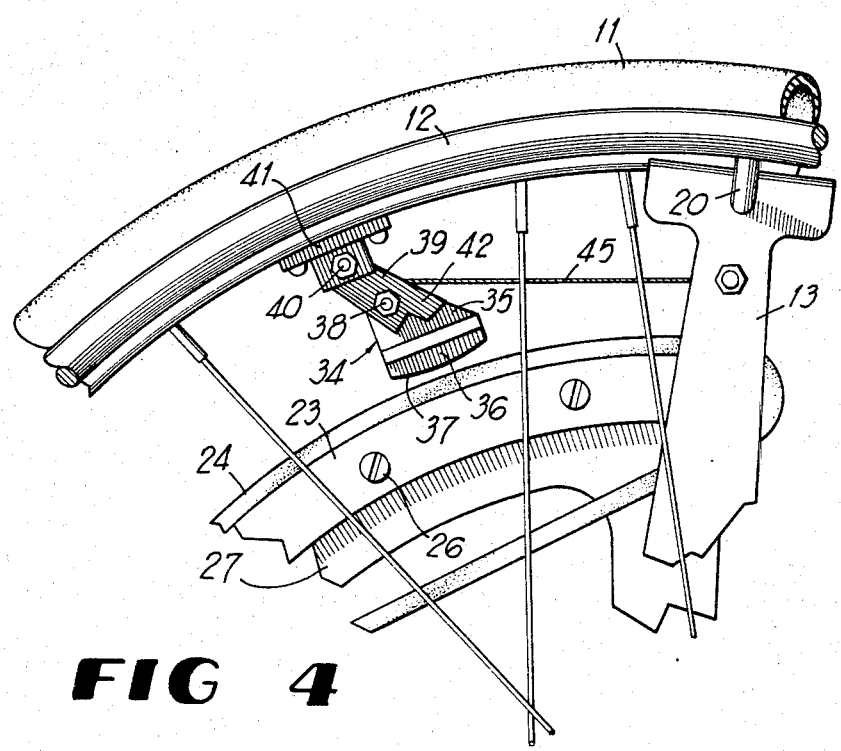
FIG. 4 is a similar view of the mechanism released to allow the chair to be propelled rearwardly by the occupant.

When the chair occupant at any time wishes to propel the chair rearwardly by use of the propulsion rings 12, the lost motion connection between the ring 12 and wheel 11 afforded by the spokes 13 and associated parts including the slots 17 is sufficient to tension cables 45, as shown in FIG. 4. At all other times, these cables are slack, as shown in FIGS. 2 and 3. Under tension, the cables 45 acting on extensions 49 of shoe elements 35, in effect, break the toggle joint between the arms 39 and shoe elements 35 through their pivots 38. This action relieves the pressure of the linings 36 on friction facing 24 and enables the taut cable to elevate the particular device 34 clear of the drum sector 23, FIG. 4, the device 34 turning on its pivot axis 40 under influence of the cable 45. Thus, the particular device 34, which is in frictional locking engagement with the drum sector 23, is released so that the chair can be propelled rearwardly by its occupant. Upon resumption of forward propulsion of the chair or stopping of the chair, the device 34 will automatically assume its inactive or non-locking position of FIG. 2. However, the next time that undesired rearward movement of the chair tends to begin, as on an incline, the anti-rollback mechanism will automatically return to the active position of FIG. 3 to prevent backward rolling of the chair. As in the prior referenced application, the chair occupant need never remove his or her hands from the rings 12, risking momentary loss of control of the wheelchair. The anti-rollback mechanism is simple, comparatively lightweight, reliable in operation, and is composed of inexpensive components which are adaptable to mass production methods.

Figure 6:
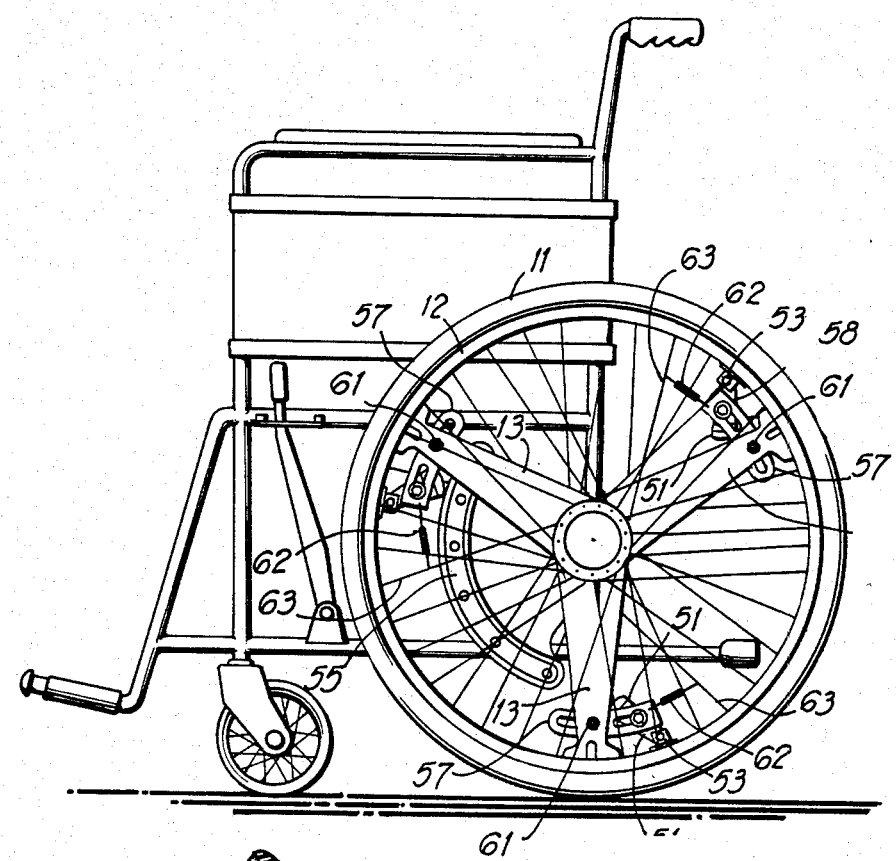
FIG. 6 is a side elevation of the wheelchair equipped with an anti-rollback mechanism according to a modified embodiment of the invention.
Figure 7:
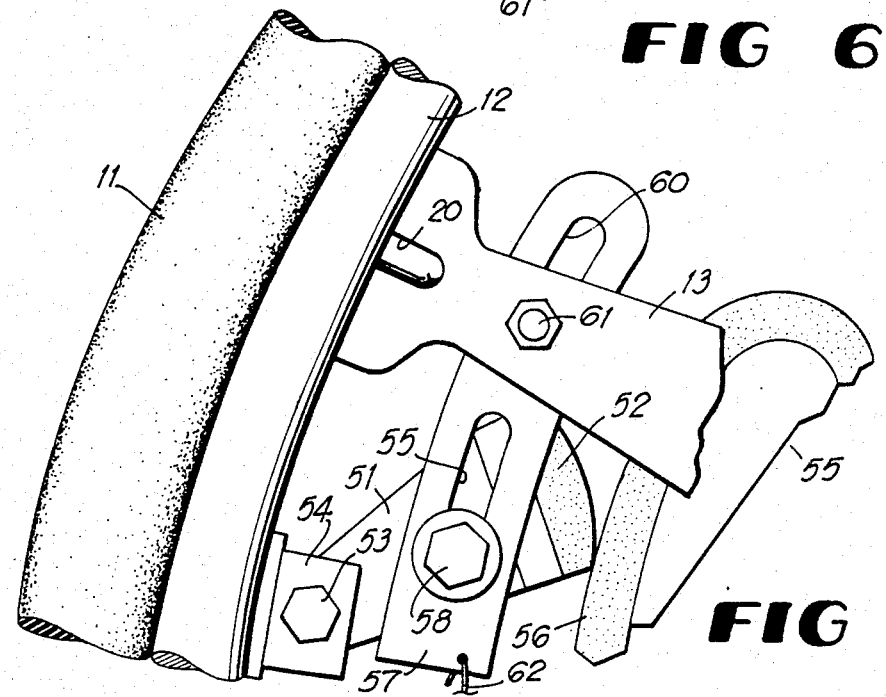
FIG. 7 is an enlarged fragmentary side elevation of the modified embodiment showing the mechanism where the chair is in the normal forward movement mode.
Figure 8:
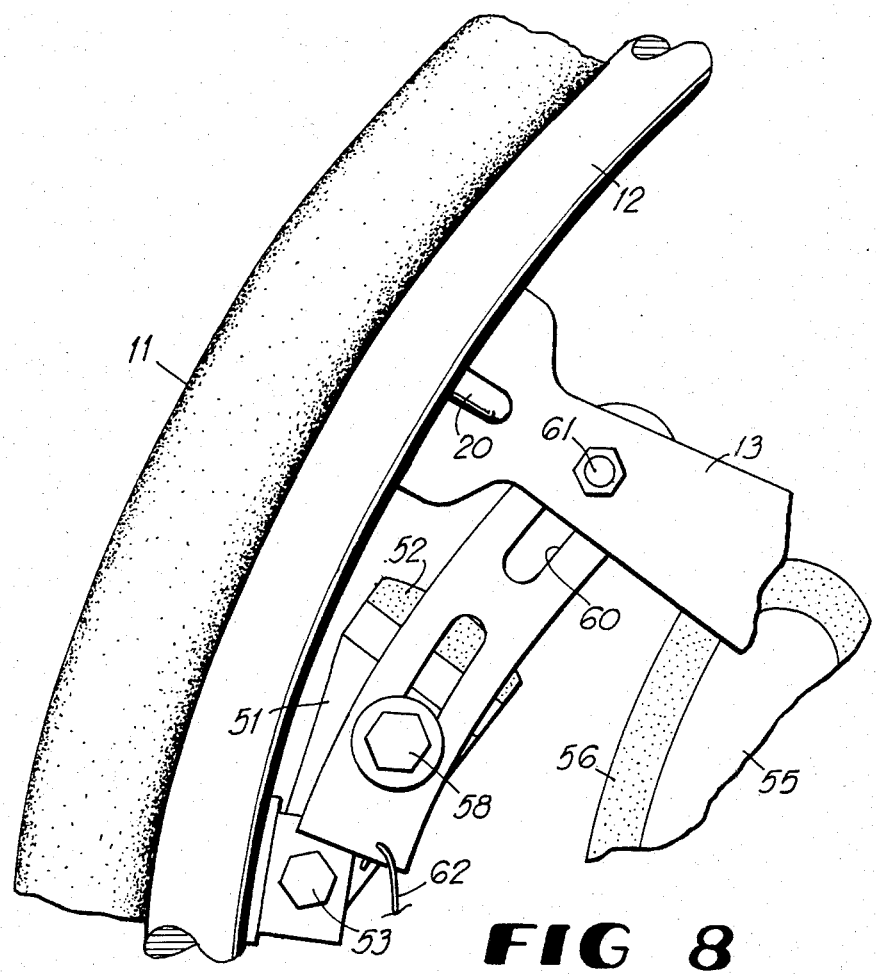
FIG. 8 is a similar view of the modified embodiment of the mechanism released to allow the chair to be propelled rearwardly by the occupant.

In FIGS. 6 through 8, a modification of the invention is depicted. In these figures, one piece brake shoe locking elements 51 having arcuate friction linings 52 are pivoted at 53 to anchors 54 fixed to the rim of chair wheel 11. The same three spoke lost motion mechanism between the chair wheel 11 and manual propulsion ring 12 previously described is employed, and essentially the same circularly curved brake drum sector 55 having a friction facing 56 is attached to the wheelchair frame.

In lieu of the previously-described cable release means for the articulated devices 34, each locking element 51 has a rigid arcuate link 57 adjustably secured thereto by a bolt 58 engaging through an adjusting slot 59 of the link to form a pivotal connection. An arcuate lost motion slot 60 provided in the link 57 receives slidably therethrough a bolt 61 or the like on the spoke 13.

FIG. 7 depicts the anti-rollback mechanism according to the modification in a mode whereby the wheelchair can be propelled forwardly by use of the manual rings 12 in a normal manner, with each locking element 51 being dragged lightly across the friction facing 56 of drum sector 55.

A retractile spring 62 is connected between one end of each link 57 and one wire spoke 63 of the chair wheel 11. During forward propulsion of the chair, the springs 62 are not stretched and exert no restraining force on or through the links 57.

However, when the occupant consciously propels the chair in a reverse mode through use of the manual rings 12, the described lost motion connection through the spokes 13 and associated parts will stretch or tension the springs 62 and the bolts 61 of spokes 13 will move to the ends of slots 60, following which the pivoted locking elements 51 are turned on their pivots 53 and swing out of engagement with the fixed drum sector 55, FIG. 8, to enable conscious rearward propulsion of the chair. Upon stopping of the chair or resumption of its forward movement, the springs 62 are relaxed and the parts return automatically to their normal free forward propulsion positions shown in FIG. 7.

The modified anti-rollback mechanism operates automatically on an incline or the like to resist chair rollback in substantially the identical manner previously-described in connection with the prior embodiment of the invention. In each embodiment, a lost motion connection between the wheel 11 and propulsion ring 12 is utilized in conjunction with a simple over center release linkage or mechanism to lift pivoted anti-rollback devices out of contact with the brake drum sector.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. In a wheelchair, a main chair wheel, a manual propulsion ring disposed adjacent to said wheel, means forming a lost motion connection between the propulsion ring and said wheel, a relatively stationary drum element fixed on said chair near said wheel, at least one pivoted over center cooperative braking device attached to the wheel and turning therewith and passing freely across the surface of the drum element during forward propulsion of the chair and automatically assuming an anti-rollback positive locking position with the drum element when the chair tends to roll back on an incline, and connecting means between the means forming a lost motion connection and the pivoted over center braking device and being operable to move the braking device out of engagement with the surface of the drum element during conscious backward propulsion of the wheelchair by its occupant.

2. In a wheelchair as defined in claim 1, and said pivoted over center cooperative braking device being an articulated device, and said connecting means comprising a flexible element connected between the articulation axis of said device and the means forming said lost motion connection.

3. In a wheelchair as defined in claim 1, and said pivoted over center cooperative braking device comprising a single pivot device, and said connecting means comprising a link connected between the single pivot device and the means forming said lost motion connection.

4. In a wheelchair as defined in claim 3, and said link having a slotted connection with the means forming said lost motion connection, and a retractile spring connected between one end of the link and a part of the main chair wheel and resisting movement of the link in one direction during conscious backward propulsion of the wheelchair by its occupant.

5. In a wheelchair as defined in claim 1, and said drum element comprising a drum sector extending for a portion only of the circumference of said main chair wheel, and a plurality of pivoted over center cooperative braking devices attached to the wheel in circumferentially spaced relationship, whereby at least one cooperative braking device is always adjacent to the periphery of said drum sector during rotation of said main chair wheel.

6. In a wheelchair as defined in claim 1, and said means forming a lost motion connection comprising a spoked spider fixed to said manual propulsion ring and turning therewith and having a lost motion connection with the main chair wheel.

7. In a wheelchair as defined in claim 6, and the lost motion connection with the main chair wheel comprising a slotted connection.

8. An anti-rollback mechanism for a manually propelled wheelchair having a pair of main wheels and a pair of manual propulsion rings near the outer sides of the main wheels, lost motion means connected between at least one manual propulsion ring and the adjacent main wheel of the wheelchair, a relatively stationary brake drum element fixed to the chair near the interior side of said main wheel radially inwardly of the periphery of the main wheel and manual propulsion ring and being in concentrically spaced relationship to said periphery, at least one pivoted over dead center braking device attached to the main wheel near its periphery and radially outwardly of the brake drum element and automatically engaging the brake drum element in a locking mode to resist backward rolling of the wheelchair on an incline while allowing free forward manual propulsion of the wheelchair through said manual propulsion rings, and means connected between said lost motion means and said pivoted over dead center braking device to release the latter from engagement with the brake drum element during conscious rearward propulsion of the wheelchair through said manual propulsion rings.

9. An anti-rollback mechanism for a manually propelled wheelchair as defined in claim 8, and said pivoted over dead center braking device being an articulated device, and said means connected between said lost motion means and said braking device comprising a cable connected with the device near and on one side of its articulation axis.

10. An anti-rollback mechanism for a manually propelled wheelchair as defined in claim 8, and said means connected between said lost motion means and said pivoted over dead center braking device comprising a slotted link, and a spring connected between said link and a spoke of one of said main wheels.

11. An anti-rollback mechanism for a manually propelled wheelchair as defined in claim 8, and said relatively stationary brake drum element comprising a brake drum arcuate sector extending for a portion only of the periphery of said main wheel, and a plurality of circumferentially equidistantly spaced pivoted over dead center braking devices attached to the main wheel near its periphery, whereby at least one of said braking devices will be positioned to engage said brake drum arcuate sector during rotation of said main wheel.

12. An anti-rollback mechanism for a manually propelled wheelchair as defined in claim 11, and each pivoted braking device comprising an anchor element fixed on said main wheel, and a pivoted brake shoe element connected with said anchor element and having a friction lining for engagement with a friction facing of the brake drum element.

13. An anti-rollback mechanism for a manually propelled wheelchair as defined in claim 12, and the pivoted brake shoe element comprising an articulated element including an arm pivotally connected with said anchor element, and a brake shoe element pivotally connected with said arm.

14. An anti-rollback mechanism for a manually propelled wheelchair as defined in claim 13, and said arm having extension means engageable with ledge surfaces of the brake shoe element to limit pivoting of the brake shoe element in one direction relative to said arm.

* * * * *